United States Patent
Morris

(10) Patent No.: US 7,279,126 B2
(45) Date of Patent: Oct. 9, 2007

(54) METHOD OF PRODUCING SHARED ARTICLES

(76) Inventor: Robert Craig Morris, 208A Emmans Rd., Flanders, NJ (US) 07836

(*) Notice: Subject to any disclaimer, the term of this patent is extended or adjusted under 35 U.S.C. 154(b) by 522 days.

(21) Appl. No.: 10/420,111

(22) Filed: Apr. 18, 2003

(65) Prior Publication Data

US 2004/0217524 A1 Nov. 4, 2004

(51) Int. Cl.
- *C04B 33/32* (2006.01)
- *B22F 9/00* (2006.01)
- *C04B 35/00* (2006.01)

(52) U.S. Cl. .................. 264/639; 264/669; 264/670; 264/122

(58) Field of Classification Search ........ 264/621–623, 264/669, 645, 670, 109, 122; 419/36–38, 419/65, 47, 31; 75/246
See application file for complete search history.

(56) References Cited

U.S. PATENT DOCUMENTS

| | | | | |
|---|---|---|---|---|
| 4,715,422 A * | 12/1987 | Tommis et al. | ............ | 164/97 |
| 4,734,237 A | 3/1988 | Fanelli et al. | ............ | 264/122 |
| 5,250,254 A | 10/1993 | Achikita et al. | ............ | 419/37 |
| 5,258,155 A | 11/1993 | Sekido et al. | ............ | 264/109 |
| 5,286,767 A | 2/1994 | Rohrbach et al. | ............ | 524/27 |
| 5,746,957 A | 5/1998 | Fanelli et al. | ............ | 264/109 |
| 5,985,208 A | 11/1999 | Zedalis et al. | ............ | 419/36 |
| 6,045,748 A * | 4/2000 | Hayashi | ............ | 264/669 |
| 6,261,336 B1 | 7/2001 | Behi et al. | ............ | 75/246 |
| 6,268,412 B1 | 7/2001 | Zedalis et al. | ............ | 524/27 |

OTHER PUBLICATIONS

Agar, retrived from http://www.fao.org/docrep/W6355E/w6355e03.htm on Aug. 23, 2006, 3 pages.*
Gogos, et al, "Melting Phenomena and Mechanisms in Polymer Processing Equipment" *Advances in Polymer Technology*, vol. 17, No. 4, 285-305 1998.
Perry et al., "Perry's Chemical Engineers' Handbook", Sixth Ed., p. 19-14 to 19-16, McGraw Hill, NY, 1984.

* cited by examiner

*Primary Examiner*—Carlos Lopez
(74) *Attorney, Agent, or Firm*—Sheldon Kavesh

(57) ABSTRACT

A novel process for manufacturing of injection molded metal, ceramic, and CERMET parts, in a manner amenable to high-volume, low-cost manufacturing, comprising the steps of forming a mechanical mixture of metal and/or ceramic powders at room temperature, a binder and a liquid carrier, said carrier being a solvent for the binder at elevated temperature; supplying the as-mixed components to the inlet hopper of an injection molding machine or extruder; molding or extruding green parts; and then drying and sintering the green parts to obtain net or near-net-shape finished metal, ceramic or CERMET parts.

11 Claims, 3 Drawing Sheets

METHOD OF PRODUCING SHARED ARTICLES

BACKGROUND OF THE INVENTION

1. Field of the Invention

The invention is simplified processes for shaping metal, ceramic, and CERMET (ceramic/metallic) parts and shapes from powder/binder mixtures. More particularly, the invention is directed to integration of the compounding and plasticizing processes for economical manufacturing of complex molded shapes which exhibit excellent green strength and which can be readily sintered to produce high quality net shape or near net shape parts.

2. Description of the Related Art

The production of sintered parts from injection molded "green" bodies is well known in the art. Generally, the green body is formed by injecting a fluid powder/binder mixture into a die cavity under pressure and allowing the injected material to cool and solidify in the cavity. The green body, now a self-supporting structure, is then removed from the die cavity and sintered. During the sintering process, the residual binder is volatilized and the powder particles join together to form a monolithic solid body. This process is variously known as Powder Injection Molding (PIM), Metal Injection Molding (MIM), or Ceramic Injection Molding (CIM), depending on the nature of the powdered material.

Heretofore, aqueous compositions useful as injection molding precursors have been pre-compounded, prior to molding or extruding, using batch-type or continuous compounding processes. The prior art teaches that a pre-compounding step prior to molding or extrusion is required in order to achieve an intimate mixture of the binder, solvent and metal and/or ceramic powder, in which the binder material is dissolved in the solvent, and the resulting fluid binder phase is blended with the powder. For agar and agaroid binders, this compounding step has been performed at elevated temperature, since these binder materials are insoluble in water and other solvents at room temperature.

For example, U.S. Pat. No. 4,734,237 discloses the preparation of aqueous metal and ceramic injection molding compounds using a heated sigma blender for blending the precursor liquid and powder ingredients under conditions of time and temperature sufficient to insure solution of the agaroid binder in the fluid carrier phase. Injection molding compounds containing metal powder and agar binder are disclosed in U.S. Pat. No. 5,258,155, wherein the metal powder is kneaded and heated with binder, water and other additives in a batch mixer and then either fed while still hot to the injection molding machine, or cooled and then pelletized for subsequent molding.

Aqueous injection molding compositions containing metal powder are also disclosed in U.S. Pat. No. 4,113,480, wherein the binder and metal powder are pre-blended dry and then combined with a solution of water and additives and mixed sufficiently to dissolve the binder material in the solvent. In this case the binder selected is soluble at room temperature.

U.S. Pat. No. 6,261,496 discloses continuous compounding of aqueous metal and/or ceramic injection molding feedstocks, wherein metal and/or ceramic powders, binder, and liquid carrier are supplied in a continuous manner to a twin screw extruder and then compounded at a temperature sufficient to insure solution of the agaroid binder, extruded, cooled, and pelletized to produce feedstock for subsequent molding.

Pre-compounding of metal and CERMET injection molding and extrusion materials adds significant cycle time, capital equipment requirements, and labor cost to the overall part manufacturing process. Equipment used for either batch or continuous compounding of injection molding materials is intrinsically expensive for several reasons. First, the high viscosities of typical molding materials mandate very rugged mixer design and construction, as exemplified by sigma blade mixers and twin screw extruders. Secondly, heating means and temperature controllers are required. Lastly, continuous compounding requires expensive precision feeders for metering powder and liquid ingredients.

Moreover, in batch and continuous compounding of aqueous binder compositions at elevated temperatures, rapid loss of water by evaporation leads to difficulty in the precise control of the moisture content of the finished product. This is a serious difficulty since moisture content exerts profound influences on the flow properties of the material during injection molding, and on the total shrinkage of the part or shape during drying and sintering with direct impacts on mold filling, green part shape retention, and final product dimensions.

Finally, inevitable yield losses associated with the pre-compounding step add further to overall PIM, MIM, or CIM processing costs.

A need exists for simplified aqueous binder metal and CERMET injection molding processes with lower overall costs and improved process control.

SUMMARY OF THE INVENTION

The invention is an integrated process for metal and/or CERMET injection molding that eliminates pre-compounding and post-compounding steps, improves moisture level control, and thereby reduces process and product variations and significantly reduces manufacturing costs.

The invention is a simplified process of forming a shaped article comprising the steps of: forming at room temperature a homogeneous mechanical mixture comprising at least one member of the group consisting of a ceramic powder and a metal powder, a powdered binder and a liquid carrier, said liquid carrier being a solvent for the binder at elevated temperature; supplying said mixture to the input hopper of a forming means; forming a green body; drying the green body; and sintering the green body to obtain a net shape or near-net-shape dense article.

The invention also includes ceramic, metal and CERMET objects made using the aforesaid process.

DETAILED DESCRIPTION OF THE INVENTION

According to the present invention, metal and/or ceramic powders are molded and extruded into useful shapes by integrating the compounding and forming processes. In comparison to prior art methods, the invention eliminates a pre-compounding step and a post-compounding shredding or pelletizing step. The invention comprises the steps of: forming at room temperature a homogeneous mechanical mixture comprising at least one member of the group consisting of a ceramic powder and a metal powder, a powdered binder and a liquid carrier, said liquid carrier being a solvent for the binder at elevated temperature; supplying said mixture to the input hopper of a forming means; forming a green body; drying said green body; and sintering said green body to obtain a net shape or near-net-shape dense article.

Preferably, the forming means is an injection molding machine or an extruder.

As used herein, the term "metal powders" is meant to include powders of pure metals, alloys, intermetallic compounds and mixtures thereof. The term "ceramic powders" as used herein is intended to include, without limitation, powders of such materials as oxides, borides, nitrides, silicides, and carbides of metals, nonmetals or mixtures thereof, and mixtures of such materials.

Figure 1:
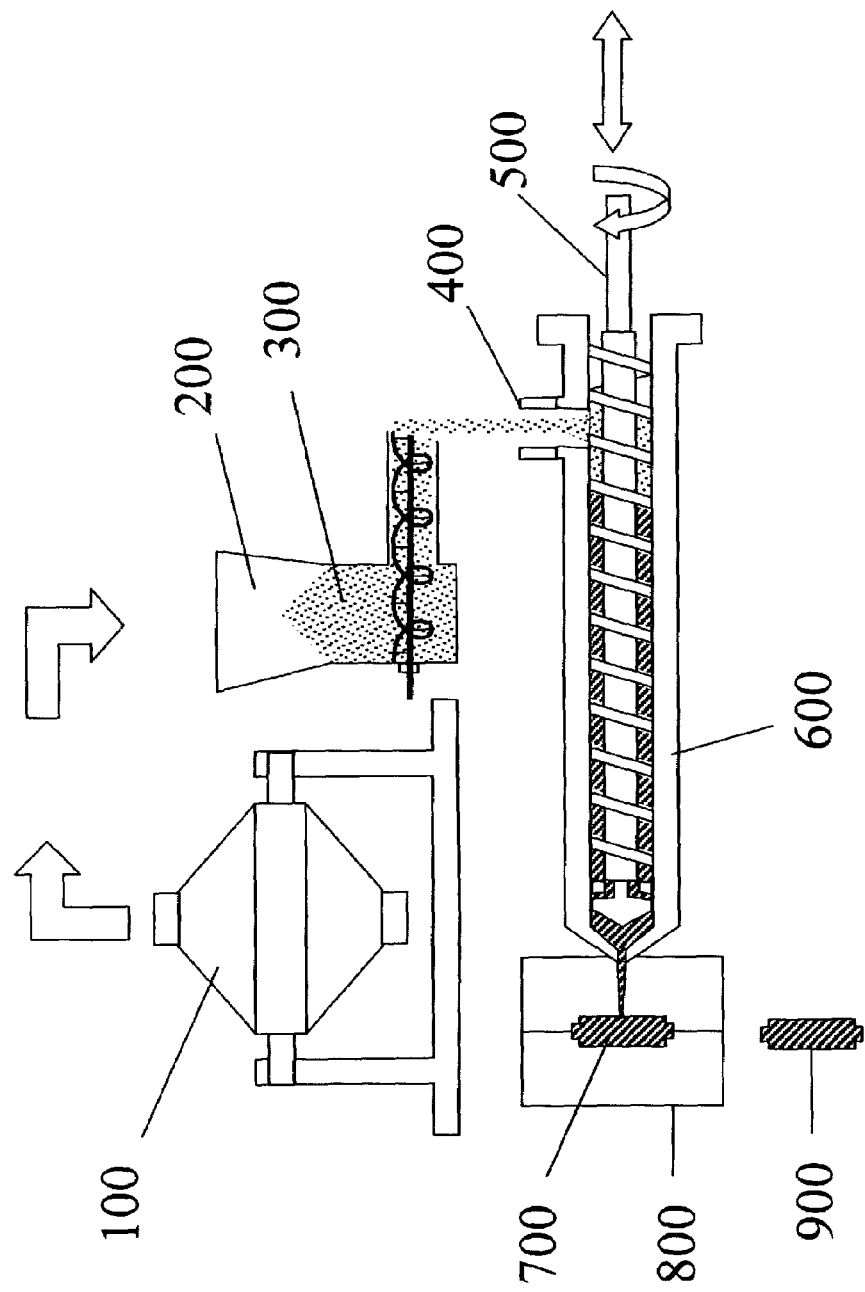
FIG. 1 is a schematic representation of the basic steps of one embodiment of the process of the invention.

FIG. 1 shows the basic steps of one embodiment of the inventive process illustrated with an injection molding machine. The metal, ceramic or CERMET powder, binder, liquid carrier and additives are mechanically combined in a mixing apparatus 100 at room temperature and then transferred to a mechanically assisted feeder 200 which feeds the mixture to the inlet of an injection molding machine 400. The screw of the molding machine 500 conveys the material through the heated barrel 600 wherein the binder and liquid carrier are mutually dissolved and homogenized to form a continuous viscous binder phase. The heated and homogenized material is then injected into the cavity 700 of a cooled mold 800. After cooling in the mold, the part 900 is removed from the mold, dried, and sintered to produce the finished net shape or near-net-shape product.

Figure 2:
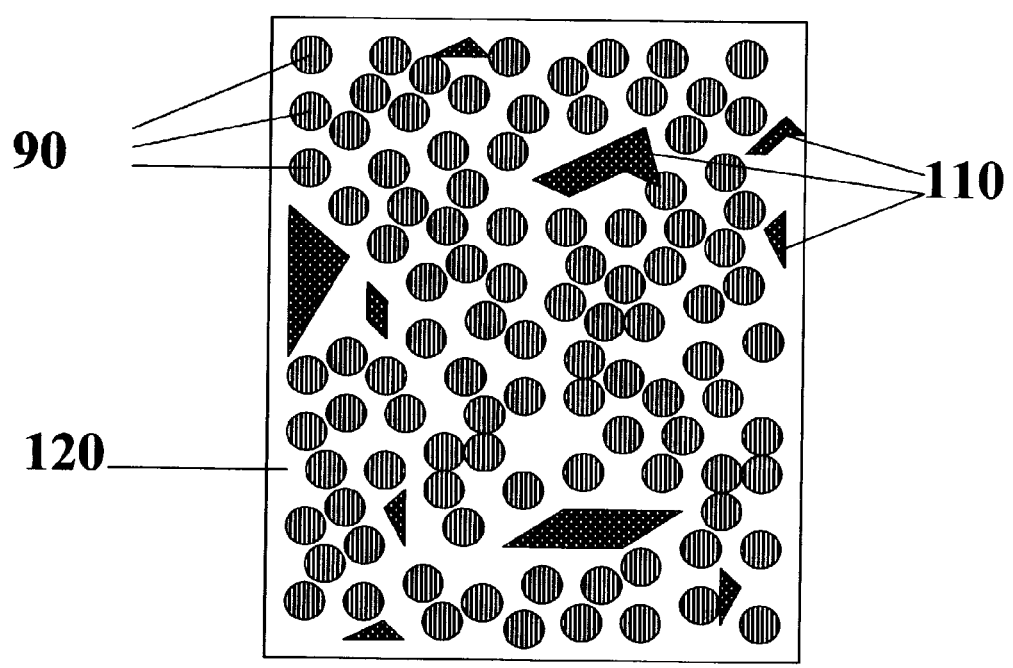
FIG. 2 is a schematic representation of the microstructure of uncompounded or mechanically mixed injection molding feedstock.
Figure 3:
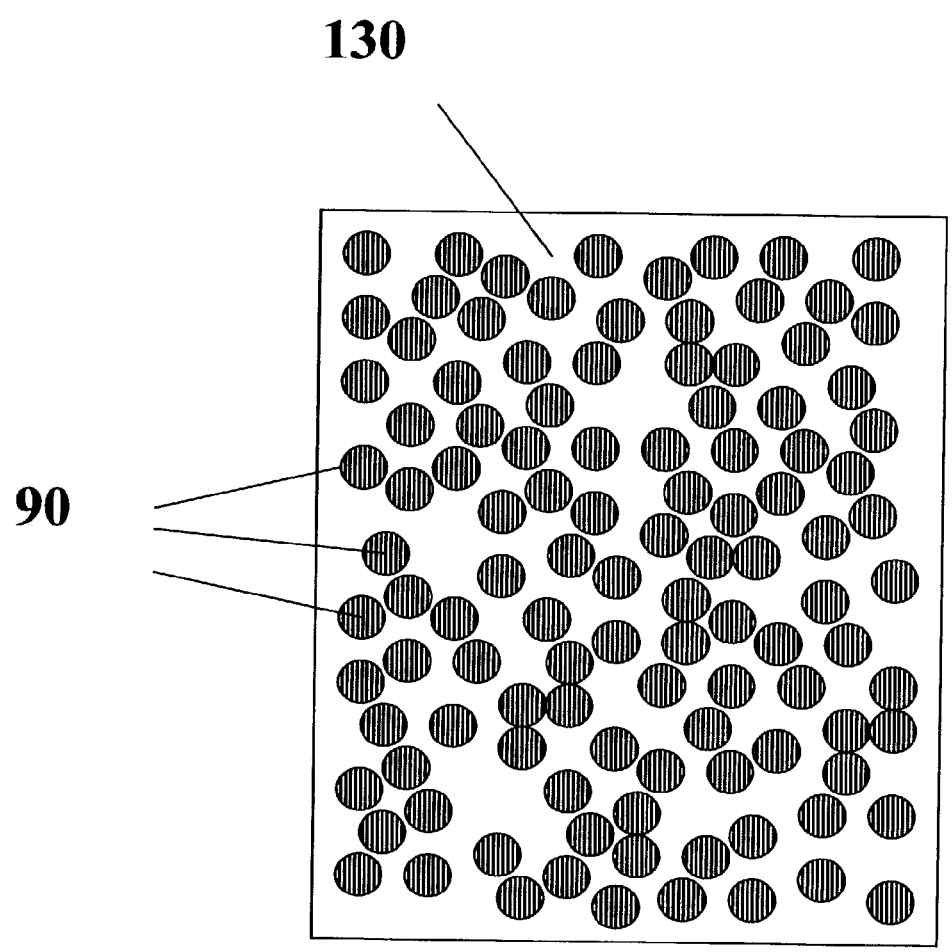
FIG. 3 is a schematic representation of the microstructure of compounded injection molding feedstock.

FIG. 2 schematically illustrates the uncompounded mechanical mixture of metal powder particles 90, undissolved binder particles 110, and liquid carrier 120, which is supplied to the inlet of the forming means, e.g., an injection molding machine. FIG. 3 schematically illustrates the structure after heating in the forming means, wherein the binder has dissolved in the liquid carrier to produce a continuous binder phase 130.

Generally, the powders comprise from about 40 to about 75% by volume of the mixture, and more preferably, from about 47 to about 62%. The preferred amounts are useful in producing net and near-net-shape injection molded parts and extruded shapes.

As used herein, binders include polymeric substances that, when dissolved in an appropriate solvent, produce gels, highly viscous suspensions or solutions at low dry substance content (generally less than about 10% by weight). The binder imparts the necessary rigidity to a green article formed in a molding process from powdered material.

A variety of water soluble binders may be used in the invention, including such classes of compounds as naturally occurring polysaccharides (as described in Industrial Gums, Academic Press, New York, N.Y., $2^{nd}$ ed., 1973), synthetic polysaccharides, cellulose, chemically modified cellulose, gelatin, alginate compounds, poly(acrylamide), poly(vinyl alcohol) and mixtures thereof. The preferred binders comprise agaroids, and the most preferred gel-forming material is agar. An agaroid is defined as a gum resembling agar but not meeting all of the characteristics thereof (See H. H. Selby and W. H. Wynne, Chapt. 3, p. 29, "Agar" in Industrial Gums, Academic Press, New York, N.Y., 2d ed., 1973).

The binder is provided in an amount between about 0.5 and about 10 wt %, based upon the solids in the mixture. More than about 10 wt % of the binder may be employed in the mixture. Higher amounts are not believed to have any adverse impact on the process, although such larger amounts may begin to reduce some of the advantages produced by the novel compositions of the present invention, especially with respect to the production of net shape and near net shape bodies. Preferably, the amount of the most preferred gel-forming binder, agar, comprises between about 1 to 3% by weight of solids in the mixture.

The binder is in the form of a dry powder with a particle size of less than about 100 mesh. For example, we have found that TIC PRETESTED® Agar Agar 100 FCC/NF Powder from TIC Gums, Belcamp, Md. is well suited for the purpose of the invention. According to the product information supplied by the manufacturer, this material requires five minutes at the boiling point of water for complete hydration and has a typical gel strength exceeding 500 $g/cm^2$ at a concentration in water of 1.5 wt. %. TIC PRETESTED® Agar RS-100 Power is also suitable. This material hydrates more easily than Agar 100 FCC, dissolving completely at a temperature of 170° F. to 180° F. (77° C. to 82° C.), but has a somewhat lower typical gel strength. TIC Agar Agar 150 FCC/NF also hydrates more easily than the TIC Agar 100 FCC/NF grade, requiring only 3 minutes at boiling for complete hydration, and has a slightly higher typical gel strength than the Agar 100 FCC/NF grade.

The mixture further includes a liquid carrier. While any of a variety of carriers may be employed depending upon the composition of the binder, particularly advantageous carriers for the classes of binders useful in the invention are polar liquids such as water, alcohols and liquids such as glycols and mixtures thereof. It is, however, most preferable to employ a carrier which can also perform the dual function of being a solvent for the binder, thus enabling the mixture to be easily transported in the extruder, as well as readily supplied to a mold in a subsequent molding process. Water is particularly suited for serving the dual purpose noted above.

The liquid carrier is normally added to the mixture in an amount sufficient to produce a homogeneous mixture having a viscosity necessary to allow the mixture to be shaped by the desired molding process or extruded through a given shaping die. Generally, the amount of liquid carrier is between about 35 to 60% by volume of the mixture depending upon the desired viscosity. In the case of water, which performs the dual function of being a solvent and a carrier for the powder/binder mixtures, the amount is generally between about 35 to 60% by volume of the mixture, with amounts between about 38 to 53% by volume being preferred.

It is a particular advantage of the invention that the solvent content of the molding mixture can be adjusted easily to tune the viscosity and/or shrinkage of the molding mixture to optimize production of a given part. For example, the moisture content of a batch of molding mixture can be increased by simply adding a measured amount of water to a known weight of molding mixture and remixing for several minutes in a small twin cone blender or other suitable mixing device.

The mixture may also contain a variety of other additives. For example, coupling agents and/or dispersants may be employed to ensure a more homogeneous mixture. Metal borate compounds can be added to increase the strength of as-molded parts and reduce cracking upon removal of parts from a mold. Corrosion inhibitors may be added to improve the chemical stability of molding mixture. For example, Behi in U.S. Pat. No. 6,261,336, teaches that sodium silicate additions stabilize iron-base powders against rusting in agar-based molding compositions. Lubricants and other additives under the general classification of processing aids, such as mono-hydric and poly-hydric alcohols; glycerin; ethylene glycol; propylene glycol; oligomers and polymers of poly(ethylene oxide); stearic acid and metal stearate compounds, may be added to assist in feeding the mixture along the bore of the barrel of an extruder or injection molding machine and reduce the vapor pressure of the liquid carrier, thereby enhancing the production of the near net shape objects. Monomeric sugars, including glucose, sucrose, dextrose, fructose and the like may be added to increase the fluidity of the composition, as taught be Behi in U.S. Pat. No. 6,262,150. These fluidizing agents can be used to increase the volume fraction of metal powder in agaroid-based molding compositions leading to reduced shrinkage in the sintering step.

The, amount of a given additive will vary depending on the nature of the additive and its function within the system. Dispersants are frequently added to ceramic suspensions to enhance dispersion. Preferred amounts of dispersants are generally between about 0.2 to 2% by weight based on the solids in the mixture. Coupling agents may be used to facilitate compatibility between powder and matrix in amounts preferably between about 0.2 to 1.5% by weight based on the solids in the mixture. Metal borate gel strengtheners may be used in amounts from about 0.01 to 1% by weight of the total mixture. Lubricants and other processing aids may be added in amounts ranging from about 0.1 to 10% by weight of the solids in the mixture, the specific amount being dependent on the particular purpose intended. Biocides, such as potassium sorbate and sodium benzoate, in amounts preferably between about 0.01 to 0.5% by weight, based on the total mixture, may be added to impede yeast, mold, and bacterial growth. Additive concentrations can be adjusted to facilitate production of a given part.

According to the inventive process, the metal and/or ceramic powders are mechanically mixed with the binder and liquid carrier at room temperature. Optionally, one or more additives may be included in the mixture to produce certain desirable properties in the feedstock composition. The mixing step may be performed as a batch process using suitable powder mixing geometries well known in the art, such as twin cone mixers, V blenders, ribbon mixers, conical screw mixers, and shovel mixers. Alternatively, mixing can be performed as a continuous process, for example, using volumetric or gravimetric feeders combined with an axial-flow, plowshare-in-trough mixer geometry. In all these cases the cost of the mixing equipment is significantly less than the cost of high viscosity compounding equipment of similar capacity or throughput. The components may be in the form of powders, liquids and suspensions of powders in liquids. The components may receive pretreatment before mixing; for example, metal and/or ceramic powders may be ground to reduce the particle size prior to mixing. Similarly, low temperature soluble additives may be pre-dissolved in the liquid carrier prior to final mixing. Preferably the dry components, including the metal and/or ceramic powder, the binder, and dry additives, are thoroughly mixed in the dry state and then the liquid components, including the liquid carrier and dissolved additives are added during the mechanical mixing process.

For molding compositions in the preferred ranges of solid and liquid content, the resulting mechanical mixture has the consistency of a damp powder and does not flow readily under the influence of gravity alone through the conventional conical hoppers typically used to supply pelletized molding feedstocks to the screw of an injection molding machine. This is due to the large particle-to-particle cohesive forces which are produced by the surface tension of the fluid carrier phase. These forces may lead to arch formation above the exit orifice of a gravity fed hopper.

Therefore it is preferred to supply the damp powder mixture to the inlet of an injection molding machine using mechanically assisted feeding apparatus employing well-known auger, vibratory or other means known in the art to prevent arch formation. Pneumatically assisted fluidized bed feed devices, however, are not preferred for this purpose because of the possible evaporative loss of moisture. We have found that auger-based volumetric solids feeders, of the type commonly used in the plastic compounding industry are ideal for this purpose. Volumetric feeders provide the additional advantage that the material input rate can be varied in a periodic fashion which is synchronized with the material feed requirements of the molding cycle. An auger assisted volumetric feeder 200 is illustrated schematically in FIG. 1.

The powder feeding device is preferably situated such that the damp powder mixture falls from the feeder exit through a short vertical-wall tube 400 directly through the feed-throat onto the rotating screw of the injection molding machine. Preferably, the inner wall of said tube is smooth and is constructed from a non-wetting low friction material, such as PTFE, to prevent adherence of the said damp powder mixture. The feeder is preferably controlled so that material is fed only while the injection molding machine screw is rotating, and during this time is fed at a rate equal to or slightly less than the rate at which the screw conveys powder into the barrel. This avoids accumulation of material at and around the feed-throat region.

The molding compositions prepared according to the present invention are ideally suited to fabrication of articles by injection molding. The preferred injection molding apparatus is the well-known reciprocating screw injection molding machine, the essential features of which are illustrated schematically as in FIG. 1. Surprisingly, we have found that the heating and mixing action, which can be achieved during passage of the material through the heated barrel of a reciprocating screw injection molding machine under normal molding conditions is sufficient to completely homogenize the aforesaid mechanical mixtures and dissolve the binder in the fluid carrier, and that the thus homogenized molding composition issuing from the nozzle of the molding machine is equivalent to that obtained using pre-compounded feedstock of the same nominal composition.

The molding cycle is set up in such a way that the residence time of the material in the heated portion of the barrel is preferably in the range of from about 3 minutes to about 6 minutes, depending on the hydration rate of the particular binder being used. For example, if each molding shot consumes 20% of the material in the in the barrel, then the molding cycle time, including injection, packing, mold opening, part ejection, and mold closing should be greater than approximately 1 minute. The 3 to 6 minute minimum residence time is required for complete hydration and dissolution of the agar. If the cycle time is adequate, the consistency of the plasticized material issuing from the nozzle of the molding machine will be smooth and uniform. If the cycle time is too short, the material will appear grainy and inhomogeneous. If the cycle time is marginal, the material will intermittently appear grainy and inhomogeneous.

A broad range of molding pressures may be employed. Generally, the molding pressure is between about 50 to 3,500 psi, although higher or lower pressures may be employed depending upon the molding technique used. Preferably, the molding pressure is in the range of about 100 to 2000 psi, and most preferably, about 250 to 1200 psi.

The feed screw back pressure should be set at an intermediate level, which allows ample screw recovery speed yet still compacts the molding mixture sufficiently during melting and dissolution of the binder to force out trapped air and produce a dense homogeneous fluid for injection into the mold cavity. Feed screw back pressure is preferably between 5 and 150 psi and more preferably between 10 and 50 psi.

The mold temperature must be maintained at a level capable of producing a self-supporting body. In the case of the preferred binder material, agar, the temperature of the mold must be at or below the gel point of the agar in order to produce a self-supporting body. The appropriate mold temperature can be achieved before, during or after the mixture is supplied to the mold. Ordinarily, the mold temperature is maintained at less than about 40° C. and preferably is between about 10 to 25° C.

After the part is molded and solidified in the mold, it is removed from the mold and dried. The resulting green body is self-supporting, and often requires no special handling before being placed into the furnace where it is sintered to produce the final product. For some parts with thin walls, stringent dimensional requirements, and/or more complex geometries, the green parts may by supported on shaped setters during the drying and sintering steps in order to preserve the desired geometrical details.

The sintering times and temperatures (sintering schedules) are regulated according to the powder material employed to form the part and the part specifications regarding minimum density and mechanical properties. Firing schedules are well known in the art for a multitude of materials. For example, Zhang and German discuss the sintering of MIM Fe—Ni alloys in The International Journal of Powder Metallurgy, Vol. 38, pp. 51-61, 2002). Preferably the density of the sintered body produced by the process of the invention is at least about 90% of the theoretical density.

Metallic products are normally fired in a reducing atmosphere, e.g., hydrogen, mixtures of hydrogen in argon and/or nitrogen, and cracked ammonia, to prevent oxidation. Before being brought to the sintering temperature, a body containing metal may be heated in air at slightly elevated temperatures up to about 300 degree C. to assist in removal of the small amount of residual binder and other organic material in the body as taught by Zedalis in U.S. Pat. No. 5,985,208. Carbon content can also be reduced by heat treatment in hydrogen at temperatures in the range of 500-700° C.

EXAMPLES

Comparative Example 1

This example illustrates the conventional elevated temperature compounding process for a agar-based molding composition.

A dry powder mixture was made by thoroughly mixing 4000 grams of iron-2% nickel powder (Atmix P20F from Atmix Corporation, Hachinche-shi, Aomori-ken, Japan) with 88.88 grams of powdered agar (TIC PRETESTED® Agar Agar 100) in a Paul O. Abbe, water jacket heated, 0.5 gallon capacity sigma-blade mixer running at about 20 rpm for 5 minutes at room temperature.

A solution of 1.8 grams of potassium nitrite (Alpha Aesar CAS# 7758-09-0) and 1.8 grams of potassium tetraborate (Alpha Aesar CAS# 12045-78-2) in 400 cc of distilled water was then added to the sigma mixer gradually, and mixing was continued at 20 rpm for an additional 20 minutes, still at room temperature, producing a loose, damp powder mixture containing about 89 wt. % Fe-2Ni metal powder, 8.9 wt. % of the nitrite-borate solution, and 1.98 wt. % agar.

The mixer water jacket temperature was then raised to about 89° C. over a period of 30 minutes, and held at this temperature for an additional 30 minutes while continuing to mix at 20 rpm. During heating, the temperature of the mixture rose to about 82° C. and the consistency of the mixture was altered from a loose powder to a high-viscosity fluid as the agar dissolved in the water. The high power intensity of the Sigma mixer was required to mix the material at this point.

The blended mixture was then allowed to cool for a period of approximately 1 hour, to about 38° C., at which point it was removed from the Sigma mixer in large chunks and then shredded using a Hobart food processor. The time required to prepare the batch was about 130 minutes.

After cooling, the material had a rubbery texture. The moisture content measured after shredding, using an Arizona Instruments Computrac Moisture Analyzer, was 7.28 wt. %, somewhat below the targeted level of 8 wt. %. This illustrates the difficulty in moisture level control caused by water evaporation during elevated temperature compounding. Two additional batches were compounded and shredded in the same way, except that additional water was added to compensate for evaporation losses. The three batches of shredded molding compound were blended together. The moisture content of the combined material was 8.22 wt. %.

The shredded material was supplied to the hopper of a reciprocating screw Boy 22 ton injection molding machine. Several dozen standard tensile test bars (mold cavity dimensions: overall length 6.4", gauge section 2"×0.5"×0.125") were molded using screw rotation speed of 100 rev/min., barrel and nozzle temperature setpoints of 185° F. (85° C.), injection pressure in the range of 400-800 psi, and injection speed in the range of 1-2 inches per second. The mold temperature was approximately 25° C. The cycle time was about 1 minute.

The molded test bars, thus prepared, were air dried for 24 hours resulting in a stable residual moisture content of 0.4%. Thirteen of the bars were then sintered in a 2 cubic foot batch furnace (CM Furnaces, Inc) in an atmosphere of flowing hydrogen, culminating in exposure to a maximum temperature of 1360 C for 2 hours followed by slow cooling to room temperature.

The width and thickness dimensions of the parts were measured before and after sintering in order to determine the sintering shrinkage. The sintering shrinkage in the width direction was 15.6% with an estimated standard deviation of 0.8%. The sintering shrinkage in the thickness direction was 15.6% with an estimated standard deviation of 0.7%. The theoretical density of the Fe 2Ni alloy is approximately 7.88 g/cm$^3$. The average density of the sintered test bars was 7.54 g/cc with an estimated standard deviation of 0.016 g/cm$^3$. The measured average density represented about 95.7% of the theoretical density of the Fe 2Ni alloy.

Example 1

A dry powder mixture was made by thoroughly mixing 2000 grams of Anval–22 micron 17-4 PH stainless steel powder (Powder Products Division of Carpenter Technologies, Reading, Pa.) with 44.44 grams of powdered agar (TIC PRETESTED® Agar Agar 100) in a Paul O. Abbe, 0.5 gallon (1.82 liter) capacity sigma-blade mixer running at about 20 rpm for 5 minutes at room temperature. A sigma-blade mixer was used because of its ready availability but less powerful and expensive mixing equipment would have served just as well. 177.6 grams of a saturated solution (approximately 0.25 wt. %) of calcium metaborate in distilled water was gradually added to the sigma mixer, and mixing was continued at 20 rpm for an additional 60 minutes at room temperature, producing a loose, damp powder mixture containing about 90 wt. % 17-4 PH stainless steel powder, 8.0 wt. % of the aqueous borate solution, and 2.0 wt. % agar. Based on visual observation of the material during mixing, the mixing was complete in much less than 60 minutes. The batch was now ready for molding.

The damp powder mixture was then supplied to the inlet hopper of a Boy Machines 22 Ton reciprocating-screw injection molding machine. The screw rotation rate was set at 40 rev./min. and the barrel and nozzle heater set-points were all set to 185° F. (85° C.). The damp powder mixture exhibited a tendency to bridge or arch over the feed throat did not feed into the injection molding screw readily. This problem was solved by intermittent mechanical agitation of the material in the hopper using a brass rod. After the screw was filled, a small quantity of material was extruded from the nozzle with the barrel of the molding machine in the retracted position. This initial extrudate exhibited a grainy, inhomogeneous texture and appearance. After several cycles of screw recovery and extrusion, the extrudate appeared smooth and homogeneous. A small section of the homogeneous extrudate was cooled to a rubbery state and sectioned with a razor blade. The cut face was examined in an optical microscope at a magnification of 100×, revealing a featureless and homogeneous microstructure, equivalent to the microstructure observed in the same way using pre-compounded feedstock. The nozzle of the molding machine was then moved into contact with the sprue bushing and molding of tensile test bars was commenced. The capacity of the screw was sufficient fill the test bar cavity about four times. The total molding cycle time was approximately 90 seconds, so the total residence time of the material in the screw at steady state was about six minutes. The maximum molding pressure was about 800 psi (5.49 MPa). Eleven full test bars were molded along with several others which did not completely fill the cavity. The molding results were equivalent to those which had been obtained using a conventionally pre-compounded 17-4 PH alloy feedstock.

Two full and two partial test bars were sintered in a vacuum furnace reaching a maximum temperature of 1320° C. for one hour. The two sintered full test bars had density values of 7.12 g/cm$^3$ and 7.175 g/cm$^3$ (approximately 91.5% and 92.2% of theoretical density, respectively). The relatively low density is a consequence of the low sintering temperature. 17-4 PH MIM parts made using this powder would generally be sintered at a temperature of 1350 to 1380° C. to achieve density values greater than 98%. One of the as-sintered partial test bars was bent until cracks initiated on the tensile side of the bend in order to determine the approximate elongation to fracture. The inside (compressive side) bend radius $r_c$ at the point of fracture initiation was about 0.4 inches and the specimen thickness d was 0.11 inches. This placed the neutral axis at a radius of approximately $r_n=r_c+d/2=0.455$ inches. The tensile side radius $r_t=(r_c+d)=0.51$ inches. The approximate percentage elongation on the tensile side, using this approximate method, is then $100(r_t/r_n-1)=12\%$.

It will be seen that the active preparation time for the powder batch by the method of the invention prior to molding was 65 minutes, compared to 130 minutes for the conventional process of Comparative Example 1. Moreover, similar molding behavior and similar sintered densities and appearance were obtained.

Example 2

A dry powder mixture was made by thoroughly mixing 4000 grams of iron-2% nickel powder (Atmix P20F from Atmix Corporation, Hachinohe-shi, Aomori-ken, Japan) with 111 grams of powdered agar (TIC PRETESTED® Agar Agar 100) in a Paul O. Abbe, 0.5 gallon (1.82 liter) capacity sigma-blade mixer running at about 20 rpm for 5 minutes at room temperature.

A solution containing 1.8 grams of potassium nitrite (a rust inhibitor, Alpha Aesar CAS# 7758-09-0) and 3.5 grams of potassium tetraborate (Alpha Aesar CAS# 12045-78-2) in 400 cc of distilled water, were then added to the sigma mixer along with 0.8 gm of methyl p-hydroxy benzoate (biocide, Fisher Scientific CAS No. 99-76-3), and 0.6 gm of n propyl p hydroxybenzoate (biocide, Fisher Scientific CAS No. 94-13-3), and mixing was continued at 20 rpm for an additional 20 minutes, still at room temperature, producing a loose, damp powder mixture, similar to the product of example 1, containing about 89 wt. % Fe-2Ni metal powder, 9 wt. % of the nitrite-borate solution, and 2 wt. % agar.

In this example, the nitrite and borate salts are added in part, to inhibit rusting of the Fe-2Ni powder. After three months of storage at room temperature, the moisture content and appearance of the mixture was unchanged, indicating adequate chemical stability.

The preparation time for the damp powder mixture in this example was 25 minutes compared to 130 minutes for the process of Comparative Example 1.

Example 3

Two batches of molding mixture, identical to that of Example 1 were prepared, except that the agar used for the second batch was TIC Agar Agar 150 FCC/NF (TIC 150). As in Example 1, the material was fed to the inlet hopper of a Boy 22 ton injection molding machine with all barrel and nozzle hearing zones set at 180° F. (82° C.) and screw rotation speed set at 45 rpm. A number of rectangular step thickness test bars were molded. The cavity dimensions for the step bar mold measured 1.5" wide by 2.25" long by 0.125" thick at on end, stepping down to 0.062" thick at the other end. Feed screw back pressure was varied. Twenty-five bars were molded from the TIC 100 agar batch, and nineteen bars were molded from the TIC 150 material. The parts were dried in a drying oven set at 212° F. (100° C.) for 2 hours and cooled to room temperature and then each part was weighed. The average weight of the TIC 100 batch test bars was 25.224 grams with an estimated standard deviation of 0.145 grams, while the average weight of the TIC 150 batch test bars was 25.40 grams with an estimated standard deviation of 0.13 grams. Although the results were quite similar, there is an indication of marginally higher as-molded part weight for the material made using the TIC 150 agar. This may be a result of faster melting and dissolution of the more readily soluble TIC 150 agar. Generally, higher molded part weight is beneficial since more metal powder in a given shape results in less sintering shrinkage and more reproducible final dimensions.

The nineteen step bars molded from the TIC 150 mixture were sintered in an Elnik batch furnace under hydrogen atmosphere up to a maximum temperature of 1370 C, to which temperature the parts were exposed for approximately 1 hour. The overall appearance of the sintered parts was excellent with no surface blisters evident. There was a slight bowing evident near the step in thickness. The average measured shrinkage in the length and width dimensions was about 16.5% with a standard deviation of about 0.4%. Measured densities ranged from about 7.47 gm/cc (95.8% of theoretical) to 7.77 gm/cc (99.7% theoretical). Some of the reported scatter in shrinkage and density measurements is attributable to variations in molding parameters and gradients within the sintering furnace and some is attributed to measurement errors.

Example 4

330 pounds of Atmix PF10F Fe 2% Ni powder were combined with 7.33 pounds of TIC 100 agar in a 100 gallon capacity stainless steel dual-helix ribbon blender with a shaft speed of about 60 rpm. The ribbon blender had an outer helical ribbon blade which conveyed material from right to left and an inner helical blade which conveyed material from left to right. At 60 rpm the mixing of the powders was quite energetic. The dry powders were mixed for 15 minutes and then 39.5 pounds of distilled water containing 0.5 weight % $KNO_2$ and 0.5 weight % $K_2B_4O_7$-$4H_2O$ were added gradually with the mixer blades rotating. The combined materials were then mixed for an additional 25 minutes producing a homogeneous damp powder mixture. In view of the energetic nature of the ribbon blender mixing, shorter mixing times could probably have been used.

A portion of the damp powder mixture was placed in the hopper of a KTron Soder-K2 Modular weight loss controlled twin-screw feeder and the feeder was turned on. Stable feeding of the powder mixture was demonstrated at rates of up to 200 pounds/hour with no problems other than that the level of the material in the hopper of the KTron feeder had to be kept fairly low to avoid blowing the fuse. This is not surprising as this feeder is designed to handle low density polymeric materials. A higher power rating motor would appear to be required for routine handling of high density metal powder mixtures.

This example demonstrates both large scale preparation of the molding material mixture in a standard industrial mixer and controlled feeding of the material in a standard industrial feeder.

Having thus described the invention in rather full detail, it will be understood that such detail need not be strictly adhered to but that further changes and modifications my suggest themselves to one skilled in the art, all falling within the scope of the invention as defined by the subjoined claims.

I claim:

1. A method of a producing a shaped article consisting essentially of the following steps in sequence:
    a) preparing at room temperature a homogeneous damp powder mixture comprising a powdered binder, a liquid carrier, said liquid carrier being a solvent for the binder at elevated temperature and at least one member of the group consisting of a ceramic powder, and a metal powder;
    b) supplying said damp powder mixture containing said binder powder in undissolved form to the input hopper of a forming means;
    c) forming a green body from said damp powder mixture in said forming means;
    d) drying said green body;
    e) sintering said green body to obtain a net shape or near-net-shape dense article.

2. The method of claim 1, wherein said forming means is selected from the group consisting of an injection molding machine and an extruder.

3. The method of claim 1, wherein the binder is selected from the group consisting of naturally occurring polysaccharides, synthetic polysaccharides, cellulose, chemically modified cellulose, gelatin, alginate compounds, poly(acrylamide), poly(vinylalcohol) and mixtures thereof.

4. The method of claim 3, wherein the naturally occurring polysaccharide is selected from the group consisting of agar, agarose, carrageenen, guar, locust bean, xanthan, tragacanth, gum arabic and mixtures thereof.

5. The method of claim 1, wherein the binder is selected from the group consisting of agar, agarose and mixtures thereof.

6. The method of claim 1, wherein the combined concentration of said metal and ceramic powders is from about 40 to about 75% by volume of said damp powder mixture.

7. The method of claim 1, wherein said binder comprises from about 0.5 to about 10% by weight of said damp powder mixture.

8. The method of claim 1, wherein said damp powder mixture further comprises additives selected from the group consisting of boric acid and metal borate compounds, coupling agents, dispersants, mono-hydric and poly-hydric alcohols, glycerin, ethylene glycol, propylene glycol, oligimers and polymers of poly(ethylene oxide), stearic acid, metal stearate compounds, sugars and biocides.

9. The method of claim 8, wherein said borate compound comprises from about 0 to about 5% by weight of the gel forming binder in the mixture.

10. The method of claim 1, wherein said liquid carrier is water.

11. The method of claim 1, wherein said dense article has at least about 90% of theoretical density.

* * * * *

UNITED STATES PATENT AND TRADEMARK OFFICE
CERTIFICATE OF CORRECTION

PATENT NO. : 7,279,126 B2 Page 1 of 1
APPLICATION NO. : 10/420111
DATED : October 9, 2007
INVENTOR(S) : Robert Craig Morris It is certified that error appears in the above-identified patent and that said Letters Patent is hereby corrected as shown below:

On the title page, item [54] & column 1, line 1; should read:
-- Title of Invention: METHOD OF PRODUCING SHAPED ARTICLES --.

Signed and Sealed this

Fifth Day of February, 2008

JON W. DUDAS
*Director of the United States Patent and Trademark Office*